Aug. 3, 1965    D. GAWRELUK    3,198,107
POWER TRANSMISSION
Filed Sept. 20, 1963    3 Sheets-Sheet 1

INVENTOR.
DEMETER GAWRELUK
BY
Emerson B Donnell
ATTORNEY

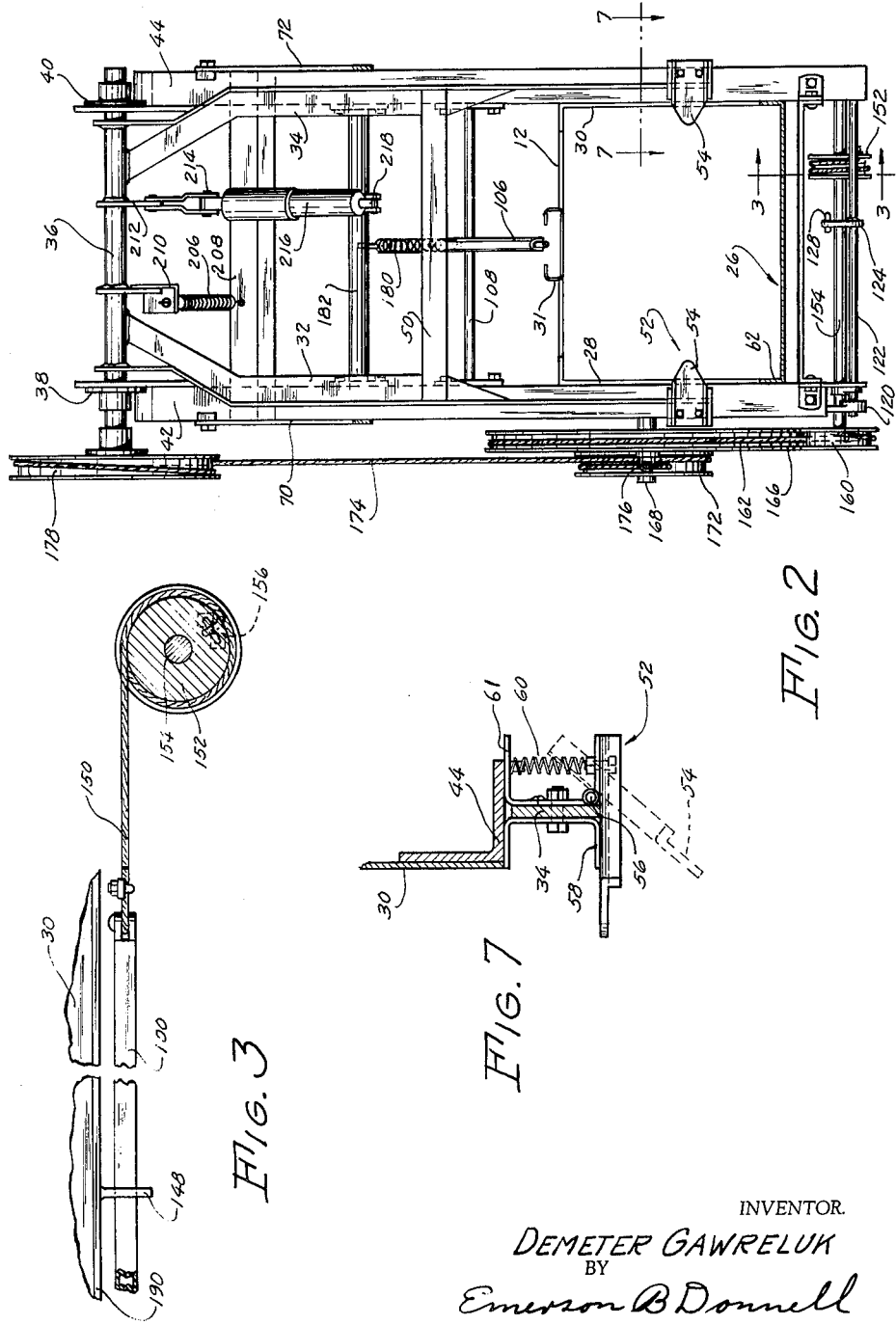

Aug. 3, 1965  D. GAWRELUK  3,198,107
POWER TRANSMISSION
Filed Sept. 20, 1963  3 Sheets-Sheet 3
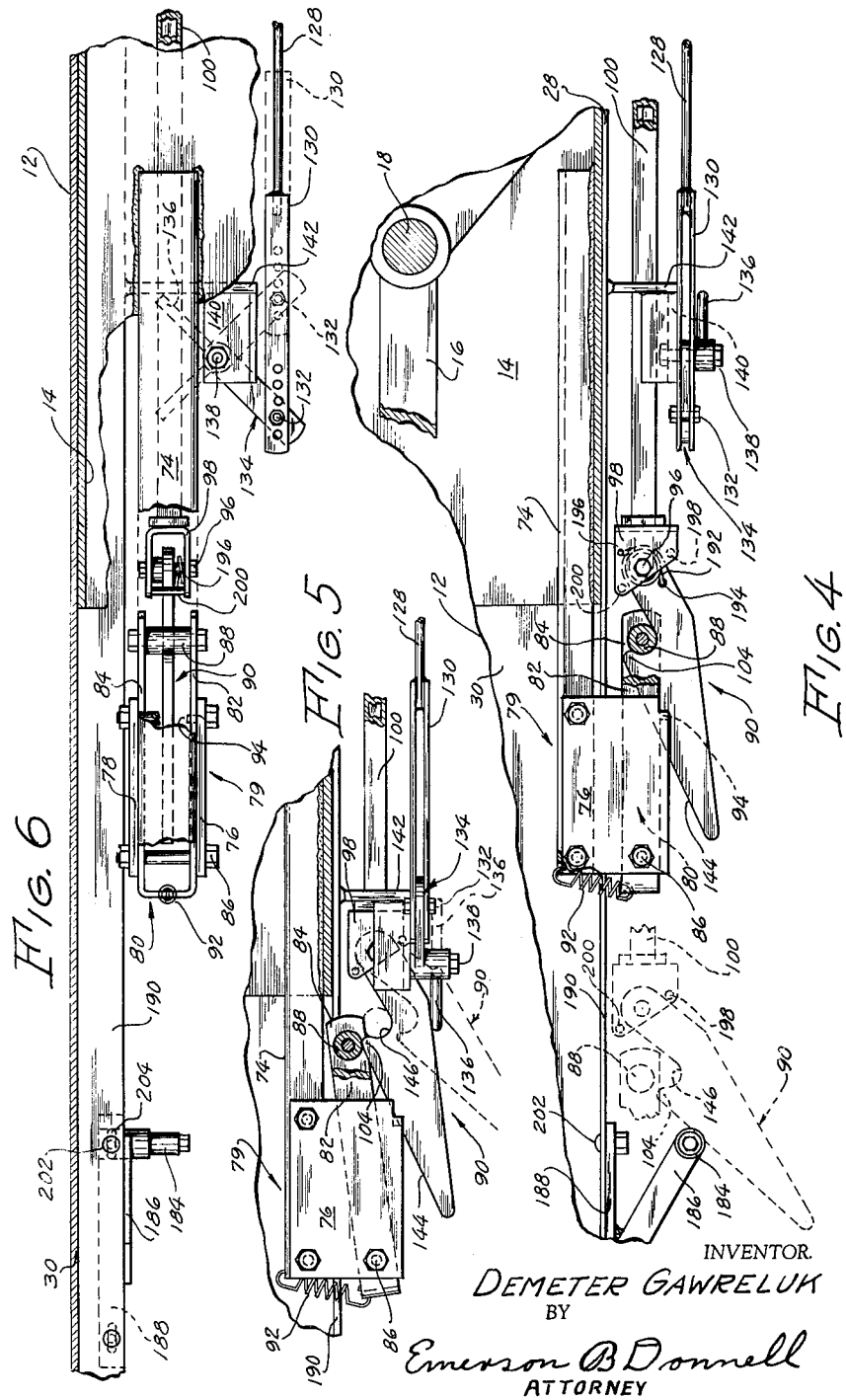
INVENTOR.
DEMETER GAWRELUK
BY
Emerson B Donnell
ATTORNEY

United States Patent Office 3,198,107
Patented Aug. 3, 1965

3,198,107
POWER TRANSMISSION
Demeter Gawreluk, Davenport, Iowa, assignor to J. I. Case Company, Racine, Wis., a corporation of Wisconsin
Filed Sept. 20, 1963, Ser. No. 310,342
3 Claims. (Cl. 100—188)

The present invention relates generally to power transmitting mechanism and particularly to such mechanism for actuating apparatus for throwing or tossing bales of hay or similar material, and variously known in the trade as bale throwers, bale launchers, etc.; and an object of the invention is to generally improve devices of this class.

Prior devices of this kind have been heavy and cumbersome, and have required complicated power trains from the baler or from the tractor; and in some embodiments, even a separate engine, all of which has added undesirable excess weight to the rear end of the baler, and also added to the cost of the device and to the expense of its operation.

Certain of these devices have been arranged to operate continuously, even though there was need for them only for an instant each time a bale was finished; for example, on the order of once a minute. Thus, the device would be running continuously throughout the entire baling operation, whereas it was actually used for only a small fraction of that time. Furthermore, some types of bale throwers have tended to cause damage to the bales, particularly by reason of the continuous running and are undesirable for this reason, either alone or in addition to their other disadvantages.

The major object of the invention is to provide such a device which will be light in weight, so as not to overburden the rear end of the baler; to utilize for its drive, power and motion already present in the baler for another purpose; to provide operation of the device during only the momentary period when it is needed, in other words intermittent operation; and which motion has desirable characteristics which will minimize strain on the apparatus and damage to the bales.

Briefly, the bale throwing device includes an impeller or propeller, generally in the form of a pendulum unit which is normally at rest, but in position to engage a bale which has been forced out of the rear of the baler by the usual operation thereof, and swinging in a chute which is so oriented that, when the pendulum is activated, it will impart motion in the direction of the desired trajectory. When a bale is finished and ready to be thrown, motion is imparted to the impeller by connecting it momentarily with the usual compressing mechanism of the baler so that the characteristic sine-wave movement of the baling plunger is utilized, the movement being sufficiently rapid to impart the necessary momentum to the bale to throw it the desired distance. The impeller is disconnected from the compressing mechanism at the instant when the velocity of the bale has become sufficient to cause it to travel the necessary distance and not "overshoot" the wagon, and this point of release is preferably made adjustable so that the distance to which the bale is thrown can be controlled.

Further objects and advantages will become apparent from the following specification and accompanying drawings, in which:

FIG. 2 is a rear elevation of the same, somewhat enlarged and partly in section on the line 2—2 of FIG. 1;

FIG. 3 is an enlarged fragmentary sectional view on the line 3—3 of FIG. 2;

FIG. 4 is an enlarged left side elevation of a fragment of FIG. 1, showing the latch mechanism in detail;

FIG. 5 is a similar view showing the parts in a different position;

FIG. 6 is a fragmentary plan view of the mechanism shown in FIG. 4 with parts broken away; and FIG. 7 is an enlarged fragmentary sectional view on the line 7—7 of FIG. 2.

Figure 1:
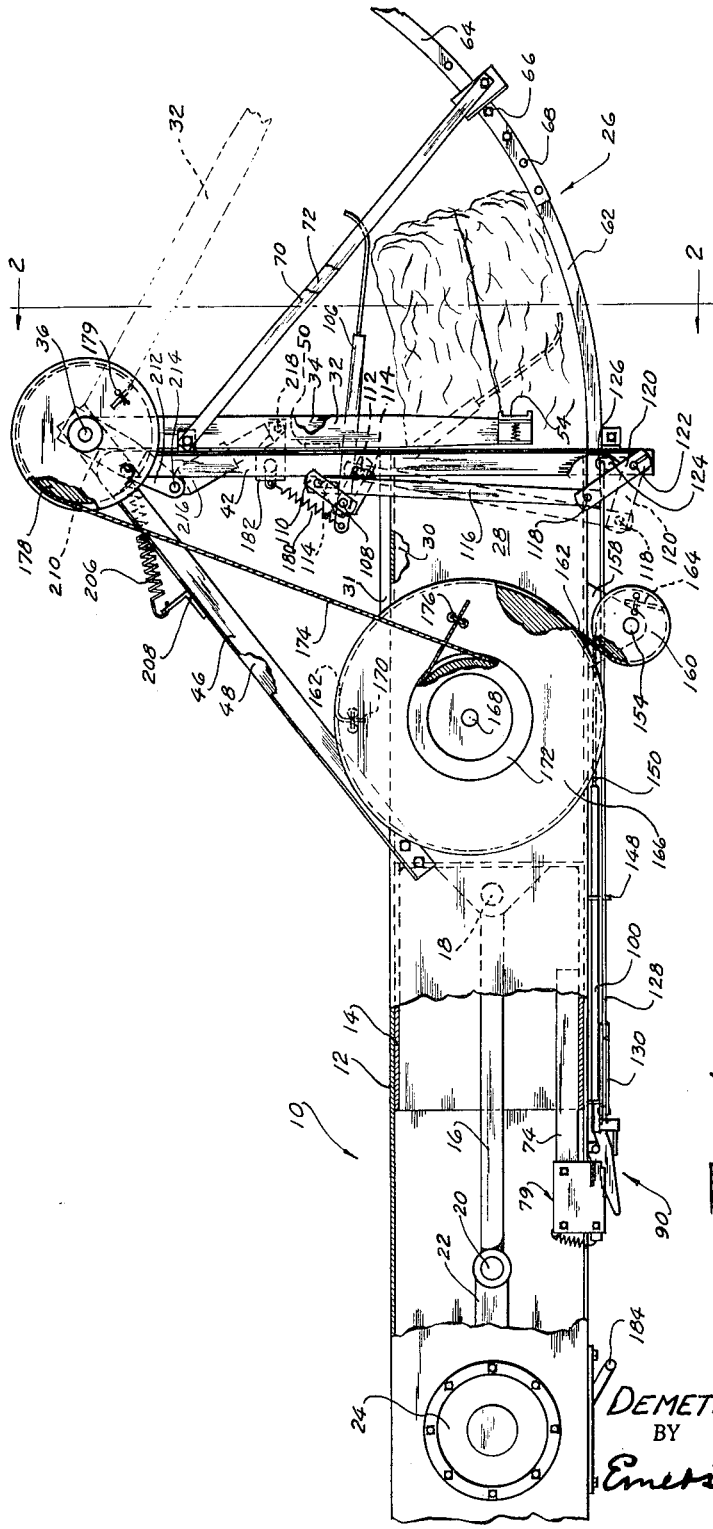
FIGURE 1 is a left side elevation of so much of a baler as necessary to illustrate the invention, parts being broken away to show what lies beneath.

As seen in FIG. 1, the baler 10, with which the device is associated comprises a casing or frame 12 in which is reciprocable a piston or plunger 14, driven by a pitman 16, pivoted at 18 to plunger 14, and at 20 to a crank 22 actuated from any suitable source of power represented by a gear case 24. Piston 14, upon uniform rotation of crank 22 will then describe a to-and-fro reciprocating motion closely in accordance with the characteristics of a sine wave. Suitable expedients, not shown, will be understood to be present for introducing hay or the like in position to be compressed by plunger 14, tied and forced gradually rearwardly out of bale case 12 onto a curved chute 26. Other well-known mechanisms characteristic of a baler are to be understood to be present but have been omitted from the drawing to avoid complication.

Bale case 12 rearwardly of plunger 14 comprises side walls 28 and 30, a compressing rail 31 (see also FIG. 2) being resiliently urged downwardly by well-known mechanism, not necessary to show, between side walls 28 and 30.

Rearwardly of the side walls 28 and 30, pendulum units 32 and 34 are spaced at opposite sides of the bale case 12 and supported on a rugged rockshaft 36 spaced substantially above bale case 12, and journaled in suitable bearings 38 and 40 carried on uprights 42 and 44 which are fixed respectively to side walls 28 and 30 and strongly braced by diagonal struts 46 and 48 so as to constitute a support for the throwing mechanism. Pendulum members 32 and 34 are connected by a cross member 50 which braces them against flexing and insures that both ends operate together upon rocking of shaft 36.

Pendulum members 32 and 34 have, each at their lower ends, a bale engaging member 52 preferably comprising members 54 of channel section (see also FIG. 7) hinged at 56 to the pendulum members in such a manner as to be capable of swinging in a counterclockwise direction, as seen in FIG. 7, but limited from swinging in a clockwise direction by abutment with a flange portion 58 fixed on pendulum member 34.

A spring 60 compressed between a flange 61 fixed on pendulum member 34 and member 54, on the opposite side of hinge pin 56 from flange 58 maintains member 54 in position to engage a bale upon actuation of pendulum member 34. A bale emerging from chamber 12 may push outwardly along chute 26 between members 32 and 34, pushing members 54 rearwardly or out of the way as it moves, until such time as pendulum members 32 and 34 are activated. At this time, members 54 will return to the FIG. 7 position under the urging of springs 60 and engage the sides of the bale sufficiently to propel the bale with substantial force rearwardly along chute 26.

Chute 26 is made of two portions 62 and 64, each comprising a wide shallow channel section, and section 64 fitting section 62 in a telescoping manner. Both sections are longitudinally arcuately formed, and section 64 may be secured to section 62 in various positions as by bolts 66 selectively placed in spaced holes 68 in the channel flanges. By securing section 64 in different places, the overall length of chute 26 may be changed along with the elevation of the outer or discharge end so that the direction of discharge of the bales may be controlled. Braces 70 and 72 extend downwardly and rearwardly from uprights 42 and 44 respectively and are suitably fastened to section 64 to support it against the rather considerable weight of the bales, and the reactions of the throwing mechanism.

As stated, the actuation or throwing movement is effected by a connection with plunger 14, which will now be described.

The plunger has a forward extension 74 on which is supported a pair of side plates 76 and 78, FIGS. 4, 5, and 6, forming with extension 74, a box-like housing 79 open at the bottom and at both ends. Between plates 76 and 78 is a lever arm 80, in the present instance U-shaped and having side arms 82 and 84. Lever 80 is pivoted on a bolt 86 extending through plates 76 and 78 spaced downwardly from extension 74, and extends rearwardly a short distance beyond the margins of plates 76 and 78. Between side arms 82 and 84 rearwardly of housing 79 is a pin or latch element 88 adapted to connect with a complementary latch portion or hook 90. A tension spring 92 pulls upwardly on lever 80 forwardly of bolt 86, thereby urging lever 80 in a clockwise direction, as seen in FIG. 4, so that side arm 82 contacts lip 94 on plate 76, maintaining lever 80 and pin 88 in what might be termed a "normal position." It will now be apparent that housing 79 and pin 88 will partake of the reciprocating motion of plunger 14 which, as stated, is a close approximation to a sine-wave movement. Hook 90 is pivoted on a pin 96 carried in a clevis 98 fixed to a pull rod 100, and in its "normal" or home position, inclines sharply downwardly, as best seen in FIG. 5 in dotted lines. Hook 90 has a lip portion 104 which in the home position of the parts is just missed by reciprocating pin 88. Therefore, plunger 14 may operate, and housing 79 and pin 88 may move back and forth idly in the usual baling process without affecting hook 90.

As a bale emerges from bale case 12, it encounters a sensing device 106, FIG. 1, comprising a rearwardly and downwardly inclined rod or runner fixed on a rockshaft 108 journaled in any suitable manner and preferably supported from uprights 42 and 44 and spaced above bale case 12. As the finished bale is forced backward and up chute 26, it swings rod 106 in a counterclockwise direction and rocks shaft 108. Shaft 108 has a lever arm 110 which is also rocked by the motion of shaft 108 and which carries a pin 112, playing in a slot 114, in a downwardly extending link 116. Link 116 is pivoted at 118 to a lever arm 120 fixed on a rockshaft 122 journaled below bale case 12 on uprights 42 and 44. Rockshaft 122 has a lever arm 124 which is pivoted at 126 to a long pull rod 128 which extends forwardly generally beneath and toward the right side of bale case 12. Pull rod 128, as best seen in FIGS. 4 and 6, has a clevis portion 130 which is pivoted by means of an upwardly directed bolt 132 to a control element 134. Element 134 has a finger portion 136 supported to extend, in one position of the parts, beneath hook 90, and is pivoted at 138 to a supporting plate or platform 140 ruggedly united to an apertured plate 142 fixed to a portion of side plate 30, and constituting a guide for above-mentioned pull rod 100. Finger portion 136, in the home position of the parts, rests in the dotted position of FIG. 5, and does not engage hook 90. However, the linkage is such that, when sensing device 106 reaches the full line position of FIG. 1, finger 136 takes the full line position in FIG. 5, and raises hook 90 so that lip 104 lies in the path of pin 88. Upon the next rearward reciprocation of plunger 14, pin 88 encounters a ramp or cam surface 144 on hook 90, and is raised to the full line position in FIG. 5 against the urging of spring 92. An instant later, upon the arrival of the plunger at its rearmost position, pin 88 will pass beyond lip 104 and drop into a notch 146 in hook 90 under the urging of spring 92. As the plunger starts its return movement, pin 88 will pull hook 90 along with it, thereby imparting the motion of plunger 14 to pull rod 100. As heretofore noted, the motion is akin to a sine curve and therefore is relatively gradual in its acceleration and exerts no appreciable shock load on any of the parts. Notch 146 is preferably undercut slightly beneath lip 104 so that hook 90 will remain engaged with pin 88 by reason of the pull being exerted between pin 88 and hook 90.

Pull rod 100 is guided in plate 142 as stated, and also in a guide plate 148, FIG. 1, fixed on bale case 12, and is connected with a flexible element or cable 150 which continues rearwardly and is wound on a sheave 152 (see also FIGS. 2 and 3) in line with pull rod 100 and fixed on a cross shaft 154. Cable 150 takes somewhat over two turns about sheave 152 and has its end anchored at 156 on the sheave. Shaft 154 is journaled in suitable bearings as 158, carried beneath side walls 28 and 30 and has a sheave 160 fixed thereon at the left side of bale case 12. Sheave 160 has a flexible element or cable 162 anchored thereon at 164 and extending generally upwardly about a larger sheave 166 journaled on a suitable shaft 168 supported on side plate 28. Cable 162 is anchored at 170 on sheave 166.

Sheave 166 has a sheave 172 fixed thereto so that the two rotate together. Sheave 172 has a cable 174 anchored at 176 in the present instance on sheave 166, cable 174 passing upwardly and over a sheave 178 fixed on above-mentioned rockshaft 36, and anchored at 179.

It will now be apparent that forward motion of hook 90 will exert a pull on cable 150 rotating sheaves 152 and 160 counterclockwise, as seen in FIG. 1. This motion will rotate sheave 166 in a clockwise direction at a largely reduced rate, thereby rotating sheave 172 also in a clockwise direction which, in turn, will cause cable 174 to rotate sheave 178 in a counterclockwise direction. This will swing pendulum members 32 and 34 in a counterclockwise direction a short distance, but sufficient to engage and impel the bale along chute 26 at a sufficient velocity to be thown a desired distance. Sheaves 166 and 172 serve to reduce the motion to the necessary rather limited amount of rotation required in rockshaft 36.

As soon as the bale has been thrown, sensing member 106 drops back to the dotted position under the urging of a spring 180 which is tensioned between member 106 and a cross member 182, the spring being connected to the member 106 at a point forwardly of rockshaft 108. Slot 114 provides considerable freedom for member 106 to move without affecting link 116.

As is well known, a sine-wave motion starts from rest, gradually accelerates to a maximum velocity and then gradually decelerates to rest, repeating the operation in a reverse direction. The desired motion of pendulums 32 and 34, however, is an acceleration to a desired maximum velocity at which the bale will leave the chute. After the bale has gone, the type of motion in pendulums 32 and 34 is immaterial.

The proportions are preferably such in the present device, that pendulums 32 and 34 would receive a greater than desired velocity at the moment of greatest velocity of plunger 14, and in order to project the bale at the desired velocity, and not to throw it too far, hook 90 is disconnected from pin 88 at the instant when pendulums 32 and 34 have reached the necessary velocity to throw the bale the desired distance. This is accomplished by a trip pin 184 supported on a bracket 186, FIGS. 4 and 6, fixed to a pad 188 fastened to the lower flange 190 of the right-hand wall 30 of bale case 12. At the proper point in the travel of pin 88 and hook 90, above-mentioned ramp portion 144 encounters pin 184 and hook 90 is swung downwardly about its pivot 96 into the dotted position in FIG. 4. Hook 90 is therefore released from pin 88 so that pull rod 100 is freed from the motion imparted up to that moment by plunger 14.

Hook 90, when shifted to the dotted position in FIG. 4, is maintained in its downwardly inclined position by a spring 192, in the present instance coiled about pivot 96 and anchored at one end 194 to hook 90 and at its other end 196 to clevis 98. Spring 192, therefore, insures against unwanted movement or bouncing of hook 90, which might otherwise initiate undesired operation of the throwing mechanism. Excessive downward movement of hook 90 is prevented by a stop pin 198, and excessive upward movement of hook 90 is prevented by an upper stop pin 200, pins 198 and 200 being fixed in clevis 98 and serving also as reenforcing and bracing means therefor.

Pad 188 is fixed to flange 190 by bolts 202 engaged in slotted holes 204 so that pad 188 may be shifted by loosening the bolts, and placed at the exact spot necessary to achieve the desired velocity in pendulums 32 and 34 at the time hook 90 is disengaged from pin 88, the adjustment being maintained by tightening the bolts when the proper position has been achieved.

As soon as hook 90 is released and rod 100 is free, pendulums 32 and 34 are promptly returned to the full line position in FIG. 1 by a spring 206 anchored to a cross member 208 fixed on braces 46 and 48 and engaged with a lever arm 210 extended generally downwardly from above-mentioned rockshaft 36. Spring 206 is powerful enough to cause prompt reverse rotation of rockshaft 36 and its attached parts so as to return pull rod 100 and hook 90 to the position shown in FIG. 5 (with hook 90 in the dotted position). Pin 88 will then continue to play back and forth idly, without engaging hook 90 until such time as the latter is again raised by finger 136.

A lever arm 212 extends generally downwardly from rockshaft 36 and is pivotally connected at 214 with a hydraulic shock absorber or dash-pot of well-known type 216, pivotally anchored at 218 to above-mentioned cross member 182. Preferably, shock absorber 216 is of the type which is telescoping in character and exerts a strong resistance to extension, but little or no resistance to collapsing. Thus, in the position of the parts shown in FIG. 1, the beginning of the motion of pendulums 32 and 34 will merely cause collapsing of shock absorber 216 so that the latter will not interfere with such movement. An instant later, however, when pendulums 32 and 34 have reached approximately the limit of their throwing movement, and after hook 90 has been released from pin 88, the relations of arm 218 and shock absorber 216 will have become such that the latter is being extended and will exert strong resistance to further movement. This resistance will promptly check the swinging movement of pendulums 32 and 34 so that spring 206 can start returning them to their inactive position, as seen in FIG. 1. Furthermore, as pendulums 32 and 34 approach the FIG. 1 position, it will be observed that shock absorber 216 is again being extended and is therefore exerting strong resistance to further rapid movement in this direction. Therefore, pendulums 32 and 34 are relatively free to move in either direction between the extreme outward and the extreme inward or downward position, but the rapid movement is gradually or gently checked at either end by shock absorber 216.

The operation of the device should be clear from the foregoing description, but in summary, it is to be noted that a bale being gradually forced rearwardly by plunger 14 will slide past bale engaging members 54, pushing them aside, as indicated in FIG. 7, until it raises sensing member 106 to the region of the full line position in FIG. 1. At this point, through link 116, pull rod 128, and their attached parts, finger 136 will be swung into position to raise hook 90 into the path of pin 88 which has been carried back and forth idly by the reciprocations of piston 14. Pin 88 upon the next rearward motion rides over cam surface 144, as permitted by upward swinging of lever 82, and drops into notch 146. The immediately following forward motion of plunger 14 and pin 88 pulls hook 90 and pull rod 100 with it without shock, in accordance with the sine-wave characteristic of the movement of plunger 14. This slides pull rod 100 forwardly unwinding cable 150 from sheave 152, rotating shaft 154 and sheave 160. Rotation of sheave 160 winds cable 162 from sheave 166, causing rotation thereof and winding of cable 174 from sheave 178 onto sheave 172. Such movement causes counterclockwise rotation of sheave 178 and with it shaft 36, thereby swinging pendulums 32 and 34 in a counterclockwise direction and throwing the bale in the direction dictated by chute 26.

At the point where the bale has reached the desired velocity, hook 90 is disconnected from pin 88 by engagement with trip pin 184, and the parts are returned to the starting position by spring 206. The stopping of pendulums 32 and 34 at either end of their movement is cushioned by shock absorber 216 and hook 90 is permitted by the return of sensing member 106 to the dotted position of FIG. 1, to drop to the inactive or lowered position of FIG. 5, so that pin 88 may play back and forth without engaging hook 90.

In this way, a bale throwing or like mechanism may be actuated in a positive but relatively gentle manner, the parts, however, being inactive except during the actual moment of throwing a bale, so that unnecessary wear and power consumption are eliminated.

Furthermore, the exact force with which the bales are thrown may be controlled by an adjustment of the position of pin 184. Also, it will be apparent that the device is relatively light in weight, simple and inexpensive. Furthermore, the parts are in operation only when needed, and the operation is relatively gentle so as to avoid damage to the bales or mechanism.

It is contemplated that variations on the above will doubtless occur to those skilled in the art, and it is to be understood that the invention is not considered to be limited by the drawings and description, or in fact in any manner, except as defined in the following claims.

What is claimed as new and desired to be secured by Letters Patent of the United States is:

1. In a bale thrower adapted to receive a bale as it emerges from a baler of the type having a reciprocating plunger slidably mounted in a longitudinal baling chamber, and to project the bale in a desired free path, the combination of a first latch element carried by the plunger for longitudinal reciprocating movement therewith in a path substantially parallel to the longitudinal axis of said baling chamber, guide means supported in fixed relation to said baler adjacent to the path of said first latch element, a longitudinally reciprocable member guided by said guide means for reciprocation in a substantially straight-line path adjacent to that of said first latch element, a second latch element mounted on said longitudinally reciprocable member, a bale propelling element, said longitudinally reciprocable member being connected with said second latch element and with said bale propelling element and arranged to impart bale propelling motion to said bale propelling element by reason of movement of said second latch element when connected to said first latch element, resilient means connected with said bale propelling element and conditioned to resist movement thereof in the direction to propel a bale, and to return said bale propelling element, when permitted, to the position which it occupied prior to the action of said longitudinally reciprocable member, means positioned to guide a bale emerging from the baling chamber into position to be acted upon by said bale propelling element, means activated by the emergence of a bale, connected to said second latch element and positioned to shift said second latch element into the path of said first latch element to become engaged therewith, and means on said baler in the path of said second latch element and positioned to disengage said second latch element from said first latch element at a predetermined desired point in the reciprocation of said plunger.

2. In a bale thrower adapted to receive a bale as it emerges from a baler of the type having a reciprocating plunger slidably mounted in a longitudinal baling chamber, and to project the bale in a desired free path, the combination of a first latch element carried by the plunger for longitudinal reciprocating movement therewith in a path substantially parallel to the longitudinal axis of said baling chamber, guide means supported in fixed relation to said baler adjacent to the path of said first latch element, a longitudinally slidable member guided by said guide means for reciprocation in a path adjacent to that of said first latch element, a second latch element mounted on said longitudinally slidable member, a bale propelling element, said longitudinally slidable member being connected with said second latch element and with said bale propelling element arranged to impart bale propelling motion to said bale propelling element by reason of movement of said second latch element when connected to said first latch element, means positioned to guide a bale emerging from the baling chamber into position to be acted upon by said bale propelling element, means activated by the emergence of a bale, connected to said second latch element and positioned to shift said second latch element into the path of said first latch element to become engaged therewith, and means on said baler in the path of said second latch element and positioned to disengage said second latch element from said first latch element at a predetermined desired point in the reciprocation of said plunger.

3. In a bale thrower adapted to receive a bale as it emerges from a baler of the type having a reciprocating plunger slidably mounted in a longitudinal baling chamber, and to project the bale in a desired free path, the combination of a lever arm pivotally carried by the plunger for swinging movement relatively thereto and for longitudinal reciprocating movement therewith in a path substantially parallel to the longitudinal axis of said baling chamber, a first latch element carried by said lever arm, guide means supported in fixed relation to said baler adjacent to the path of said lever arm and said first latch element, a longitudinally movable member guided by said guide means for reciprocation in a path adjacent to that of said first latch element, a second latch element mounted on said longitudinally movable member, a bale propelling element, said longitudinally movable member being connected with said second latch element and with said bale propelling element, arranged to impart bale propelling motion to said bale propelling element by reason of movement of said second latch element when connected to said first latch element, means positioned to guide a bale emerging from the baling chamber into position to be acted upon by said bale propelling element, means activated by the emergence of a bale, connected to said second latch element and positioned to shift said second latch element into the path of said first latch element to become engaged therewith by virtue of swinging of said lever arm, and means on said baler in the path of said second latch element and positioned to disengage said second latch element from said first latch element at a predetermined desired point in the reciprocation of said plunger.

References Cited by the Examiner

UNITED STATES PATENTS

| | | | |
|---|---|---|---|
| 2,756,865 | 7/56 | Morrison et al. | 214—83.3 |
| 2,894,651 | 7/59 | Forth et al. | 214—83.3 |
| 3,087,600 | 4/63 | Richey | 198—128 |
| 3,115,976 | 12/63 | De Buhr et al. | 214—83.3 |

WALTER A. SCHEEL, *Primary Examiner.*

LOUIS O. MAASSEL, *Examiner.*